(12) United States Patent
Farouki et al.

(10) Patent No.: US 8,457,432 B2
(45) Date of Patent: Jun. 4, 2013

(54) HIGH INFORMATION DENSITY OF REDUCED-SIZE IMAGES OF WEB PAGES

(75) Inventors: Karim T. Farouki, Seattle, WA (US); Radu C. Margarint, Kenmore, WA (US); Timothy R. Sullivan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 955 days.

(21) Appl. No.: 12/145,912

(22) Filed: Jun. 25, 2008

(65) Prior Publication Data

US 2009/0324120 A1 Dec. 31, 2009

(51) Int. Cl.
*G06K 9/42* (2006.01)

(52) U.S. Cl.
USPC .......... 382/256; 382/291; 382/290; 382/173; 382/174; 382/254; 715/238; 715/243; 715/248; 715/251; 715/252

(58) Field of Classification Search
USPC ............... 382/291, 173, 174, 176, 289, 290, 382/294, 282, 254, 286; 715/238, 243, 248, 715/251, 252
See application file for complete search history.

(56) References Cited

U.S. PATENT DOCUMENTS

| | | | | |
|---|---|---|---|---|
| 4,876,732 A | * | 10/1989 | Miyagawa et al. | 382/288 |
| 5,280,367 A | * | 1/1994 | Zuniga | 358/462 |
| 5,590,224 A | * | 12/1996 | Fast et al. | 382/291 |
| 6,356,908 B1 | | 3/2002 | Brown | |
| 6,674,912 B2 | * | 1/2004 | Igarashi et al. | 382/244 |
| 7,203,901 B2 | | 4/2007 | Wei-Ying | |
| 7,345,688 B2 | | 3/2008 | Baudisch | |
| 7,593,595 B2 | * | 9/2009 | Heaney et al. | 382/276 |
| 7,900,137 B2 | * | 3/2011 | Ivarsoy et al. | 715/238 |
| 7,953,258 B2 | * | 5/2011 | Dean et al. | 382/124 |

(Continued)

OTHER PUBLICATIONS

O'Callahan, Robert "Rendering Web Page to Images", Retrieved from http://weblogs.mozillazine.org/roc/archives/2005/05/rendering_web p.html on Apr. 18, 2008., 7 Pages.

(Continued)

*Primary Examiner* — Mekonen Bekele
(74) *Attorney, Agent, or Firm* — Wolfe-SBMC

(57) ABSTRACT

Various embodiments create a source image from a web page and then process the source image effective to remove left and/or right border areas so that a reduced-size web page image created from the source image has a better chance of capturing relevant content for a viewer. In at least some embodiments, image processing techniques are utilized to identify repeating patterns of pixels along left and/or right border areas of a source image. The image processing techniques can process individual rows of pixels looking for patterns of pixel color values. Identified patterns of pixel color values are noted and then subsequently used to remove regions of the source image in which repeating patterns occur. Having removed these regions from a source image, the source image can be reduced in a manner directed to improving information density contained in a reduced-size web page image created from the source image.

19 Claims, 4 Drawing Sheets

U.S. PATENT DOCUMENTS

| | | | |
|---|---|---|---|
| 2005/0093865 A1* | 5/2005 | Jia | 345/426 |
| 2005/0097444 A1 | 5/2005 | Ivarsey | |
| 2005/0210399 A1 | 9/2005 | Filner | |
| 2006/0195784 A1 | 8/2006 | Koivisto | |
| 2006/0288280 A1 | 12/2006 | Makela | |
| 2007/0165280 A1* | 7/2007 | Yago | 358/2.99 |
| 2007/0172137 A1* | 7/2007 | Mori | 382/239 |
| 2008/0022229 A1 | 1/2008 | Bhumkar | |
| 2008/0072168 A1 | 3/2008 | Conway | |
| 2008/0273804 A1* | 11/2008 | Malewski | 382/233 |

OTHER PUBLICATIONS

Crane, Tom "Dealing with Images in Content Management Systems", Retrieved from http://www.theguildnetwork.com/tgn/articles/imageControl_page1.aspx on Apr. 18, 2008., 5 Pages.

"Webpage Thumbnailer (4)", Retrieved from http://software.techrepublic.com.com/download.aspx?docid=340934 on Apr. 18, 2008, 3 Pages.

* cited by examiner

HIGH INFORMATION DENSITY OF REDUCED-SIZE IMAGES OF WEB PAGES

BACKGROUND

In some scenarios it can be desirable to be able to render smaller images of web pages. For example, the use of handheld or mobile devices has become fairly ubiquitous in recent times. Yet, rendering web page content on such devices has proven challenging because of the reduced form factor of the display screen of these devices. In addition, in some desktop scenarios it may be desirable to render smaller images of web pages.

Simply taking an image of a web page and scaling it to a desired size can be inadequate because of superfluous material that may appear on the web page. Specifically, many web pages include border regions on the left and right sides of the web page. Scaling a web page image that includes these border regions can result in a smaller-than-desired image of pertinent content that appears on the web page. This can, in turn, make it more difficult for a viewer to ascertain content of interest.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments create a source image from a web page and then process the source image effective to remove left and/or right border areas so that a reduced-size web page image created from the source image has a better chance of capturing relevant content for a viewer.

In at least some embodiments, image processing techniques are utilized to identify repeating patterns of pixels along left and/or right border areas of a source image. The image processing techniques can process individual rows of pixels looking for patterns of pixel color values. Identified patterns of pixel color values are noted and then subsequently used to remove regions of the source image in which repeating patterns occur. Having removed these regions from a source image, the source image can be reduced in a manner directed to improving information density contained in a reduced-size web page image created from the source image.

BRIEF DESCRIPTION OF THE DRAWINGS

The same numbers are used throughout the drawings to reference like features.

DETAILED DESCRIPTION

Overview

Various embodiments create a source image from a web page and then process the source image effective to remove left and/or right border areas so that a reduced-size web page image created from the source image has a better chance of capturing relevant content for a viewer.

In at least some embodiments, image processing techniques are utilized to identify repeating patterns of pixels along left and/or right border areas of a source image. The image processing techniques can process individual rows of pixels looking for patterns of pixel color values. Identified patterns of pixel color values are noted and then subsequently used to remove regions of the source image in which repeating patterns occur. Having removed these regions from a source image, the source image can be reduced in a manner directed to improving information density contained in a reduced-size web page image created from the source image.

In the discussion that follows, a section entitled "Operating Environment" describes but one operating environment that can be utilized to practice the inventive principles described herein in accordance with one or more embodiments. Following this, a section entitled "Creating High Density Information, Reduced-Size Web Page Images" describes embodiments in which reduced-size web page images can be created. Following this, a section entitled "Example Method" describes an example method in accordance with one or more embodiments. Last, a section entitled "Example System" describes an example system that can be utilized to implement one or more embodiments.

Operating Environment

Figure 1:
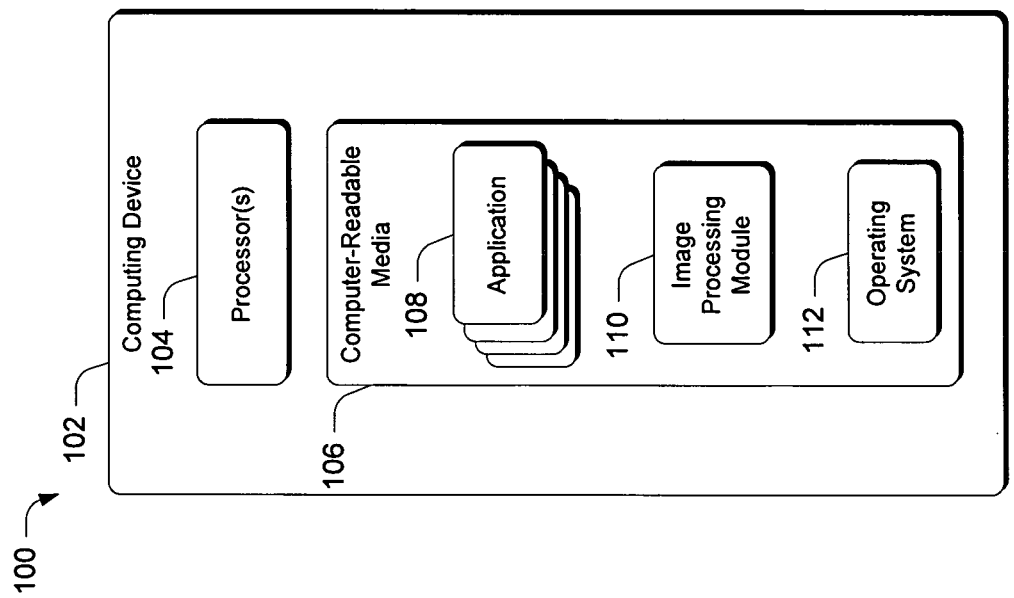
FIG. 1 illustrates an operating environment in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). Applications 108 can include any suitable type of application such as a web browser, any form of image-displaying application, or other application such as any suitable type of desktop application.

Environment 100 also includes an image processing module 110 that operates as described above and below, as well as an operating system 112. In one or more embodiments, image processing module 110 is configured to create a source image from a web page and then process the source image effective to remove left and/or right border areas so that a reduced-size web page image created from the source image has a better chance of capturing relevant content for a viewer, as will become apparent below. In at least some embodiments, the reduced-size web page image comprises a thumbnail image of a web page.

The computer-readable media 106 can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 4.

Computing device 102 can be embodied as any suitable computing device such as, by way of example and not limitation, a desktop computer, a portable computer, a server, a handheld computer such as a personal digital assistant (PDA), cell phone, and the like.

Having considered an example operating environment, consider now a discussion of how high density information, reduced-size web page images can be created in accordance with one or more embodiments.

Creating High Density Information, Reduced-Size Web Page Images

A survey of some of the most popular web pages has indicated that the most user recognizable and discernible aspects of the web page are typically anchored to the top left of the web page. As an example, consider FIG. 2.

There, an example web page is shown generally at 200. Web page 200 includes text 202 identifying a source of the web page and various links 204 that can be selected by a user for navigating to other web pages. In addition, web page 200 includes a primary or main story 206 that includes an image, a headline, and an accompanying story. In addition, web page 200 can include other headlines and stories indicated generally at 208.

Figure 2:
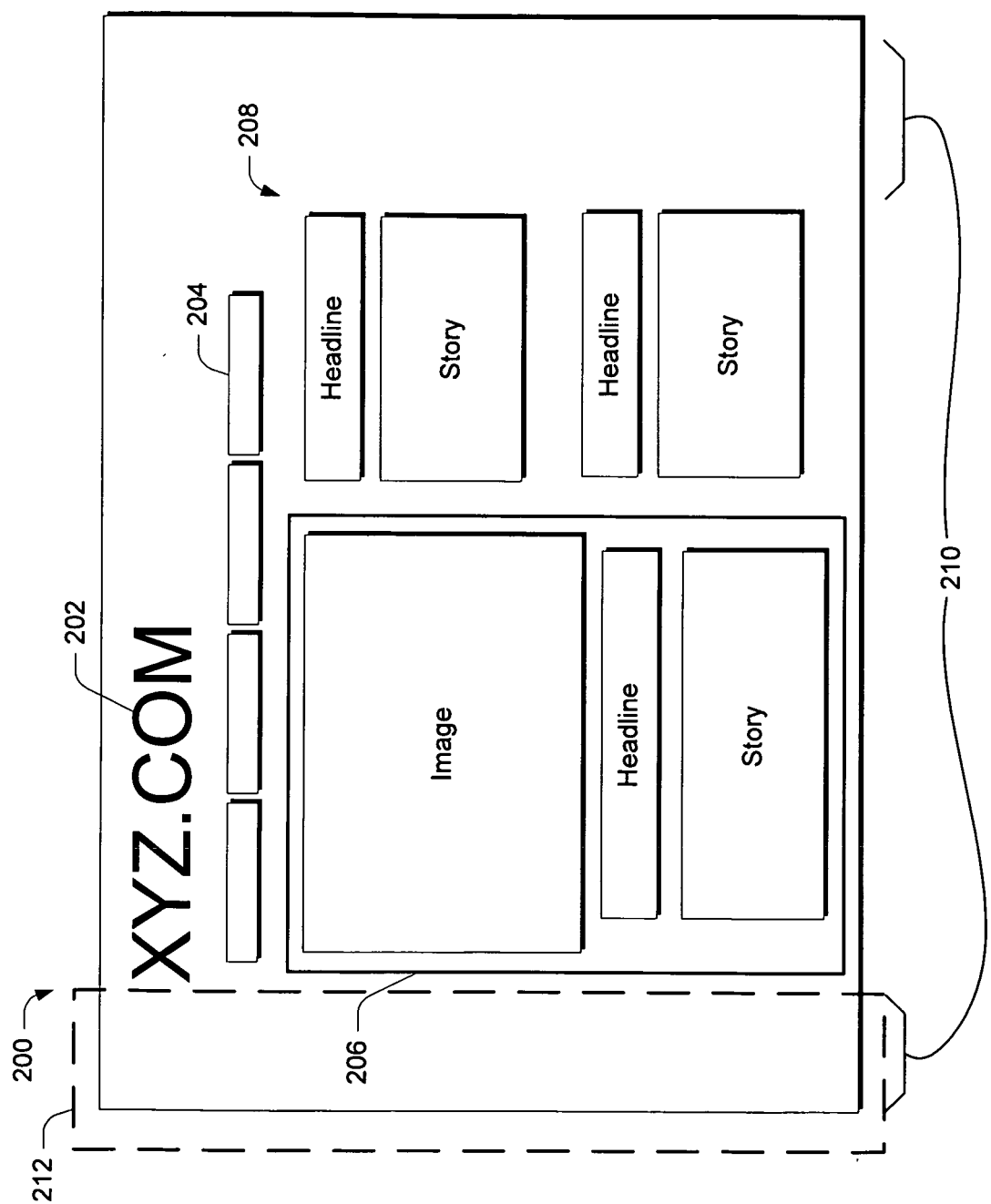
FIG. 2 illustrates an example web page.

As indicated in FIG. 2, selecting a top left portion of a relevant web page provides a good starting point for a first approximation for capturing content that is desirable to present in a reduced-size image of the web page. Yet, notice that web page 200 includes left and right border areas 210 which can typically include background images or wallpaper images that frame the web page content. When providing reduced-size images of a web page, it is desirable to remove these areas so that these areas are not scaled down when the web page is scaled down. If these areas or at least portions of these areas are not removed, when a web page is scaled down, these border areas can end up dominating the reduced-size image of the web page. This, in turn, can subordinate a web page's content for a viewer. Thus, by removing these border areas as described below, the information density of a reduced-size web page image can be increased.

In one or more embodiments, a source image is created from a web page. The source image can comprise a screen capture of the web page. The source image is then processed effective to remove left and/or right border areas so that a reduced-sized web page image is created from the source image and has a better chance of capturing relevant content for a viewer.

In the discussion just below, an image processing technique is described in the context of identifying and then removing a left border area, such as left border area 210 in FIG. 2.

In one or more embodiments, the image processing technique starts with a first row of the source image. The first row can be the top row of the source image. The image processing technique looks at the first row and attempts to find a repeating pattern in terms of pixel color values. If a repeating pattern of pixel color values is found, such repeating pattern quite likely corresponds to a background or wallpaper image that does not contain information of value.

To locate repeating patterns, in at least some embodiments, the image processing technique utilizes a so-called look-back-buffer. The look-back-buffer is initialized to store a color value associated with the first pixel of a row. Individual subsequent pixels of the row are analyzed to ascertain whether their associated color values match with the color values stored in the look-back-buffer. If a matching color value is found for a subsequent pixel, the size of the look-back-buffer is increased. So, for example, if a first pixel is blue that pixel's color value is stored in the look-back-buffer. If the second pixel is also blue, then its color value is stored in the look-back-buffer whose size is now incremented to be two pixels in length. In at least some embodiments, and for performance reasons, a maximum size of the look-back-buffer can be defined. For example, in some implementations a maximum size of eight pixels might be defined for the look-back-buffer. The image processing technique continues to process individual pixels of the row looking for bigger and bigger patterns until a pattern is not found. The lengthwise dimension of a found pattern is noted and the image processing technique then continues with the next row of pixels, and so on.

In at least some embodiments, the processing described just above is directed to ascertaining patterns in a border area that correspond to a rectangular area that can be removed from a source image. Of course, the technique need not necessarily look for uniform rectangular areas. However, in at least some embodiments, removing a rectangular border area provides a more uniform appearance for a reduced-size image of the source image. Such rectangular area might correspond, for example, to the border area contained within rectangle 212 in FIG. 2.

In at least some embodiments, one or more performance enhancements can be utilized to process a source image in a more efficient manner.

As a performance enhancement, if on a given row a maximal length consecutive pixel run is X, and the image processing technique has just finished testing with a look-back-buffer of length Y, where Y<X, the image processing technique can start with the pixel corresponding to Y+1. For example, if a pattern is eight pixels long and includes four red pixels and four blue pixels, when the next row is processed, rather than starting at the first pixel and proceeding to the second pixel and so on, the image processing technique can start its processing at the fifth pixel. Specifically, since the image processing technique would have arrived at a run length of four pixels by using a pattern length of one, the image processing technique can now start directly using a pattern length of five when it processes the next row.

As another performance enhancement, in at least some embodiments, a minimum of the longest pixel run per row can be defined and used as a threshold above which testing is not performed. Specifically, the image processing technique can process individual rows as described above. During processing, the image processing technique can note the minimum of the longest pixel run per row. This value can then be used as a threshold beyond which processing of pixels in a particular row is not performed. For example, assume that the first row of a source image is identified to have a pattern that is 65 pixels wide whereas the image itself may be 800 pixels wide. When the image processing technique proceeds to the next row, image processing can terminate after the $65^{th}$ pixel. One reason for doing this is to provide a uniform vertical line that defines the edge of a rectangle having a uniform width. The defined rectangle, in turn, defines a border area that is to be removed. If on subsequent rows a pattern is found to have a narrower width, the value of this narrower width is then used as the minimum of the longest pixel run per row. Effectively then, in at least some embodiments, the image processing technique may find a number of differently-dimensioned rectangles that correspond to identified patterns. In these embodiments, the width of the narrowest of the rectangles can be used to define the border area that is to be removed.

It is to be appreciated and understood that a pattern can vary from row to row. Accordingly, in at least some embodiments, the image processing technique does not look for the same pattern in each row. Rather, the image processing technique looks for the same length of pattern.

In at least some embodiments, other performance enhancements can take place. One such performance enhancement utilizes a so-called "skip count" which defines a number of tolerable deviations from the look-back-buffer while scanning a row, before concluding that a run is complete. For example, in some cases it may be desirable to have some type of visual lead-in in the content of a processed image. This can prevent, for example, a text component starting on the very first pixel of a processed image. This can be mitigated by using the skip count which then allows a defined number of pixels in a border area to remain after other border areas have been removed. This can be used to effectively frame a processed image so that the processed image is visually aesthetically pleasing.

In at least some embodiments, performance enhancements can include taking into account the presence of color gradients that appear in a border area. For example, a border area may start with a light blue pixel color and proceed progressively to a dark blue pixel color at the end of the border area. In these instances, the image processing technique can look at how color values change across a particular row for the purpose of identifying a pattern. Thus, in these embodiments, instead of just comparing individual pixel color values to each other, the image processing technique can also compare the difference or first derivative of the pixel color values in addition to the color values themselves. In this case, the border area would be identified by taking the larger of the two computed border widths—that is, the border width as computed in color space, and the border width as computed in the first derivative space.

Another performance enhancement can look for matches and columns that have the same color value in all of the pixels within the column. Specifically, in at least some embodiments, the above-described approach can be used and its algorithms run vertically looking for repeating patterns which span a web page. Found patterns may then be indicative of border areas.

The above-described approach was described in the context of identifying a left border area. It is to be appreciated and understood that the same technique can be used to identify a right border area as well. In this case, the image processing technique would start with the rightmost pixel in a particular row and proceed in a left wise manner. Alternately, once the left border area is identified for removal, a right border area can be defined to be the same dimension as the left border area. This approach works well for web pages that have a "centeredness" about them as a function of the DOM elements that make up the web page.

Once the left and right border areas of the source image have been computed and removed as described above, in at least some embodiments, a portion of the bottom of the source image can be cropped to provide a resultant image with a desired aspect ratio. This resultant image can then be scaled to provide a reduced-size web page image from a source image.

EXAMPLE METHOD

Figure 3:
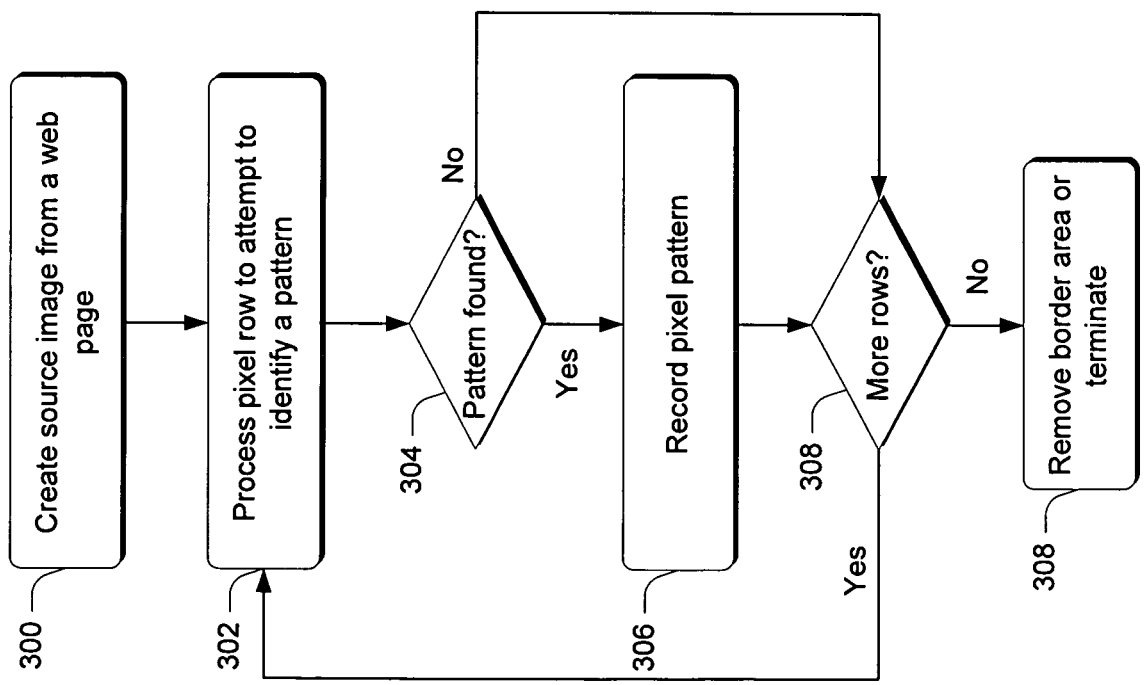
FIG. 3 is a flow diagram that describes steps in a method in accordance with one or more embodiments.

FIG. 3 is a flow diagram that describes steps a method in accordance with one or more embodiments. The method can be implemented in accordance with any suitable hardware, software, firmware, or combination thereof. In at least some embodiments, the method can be implemented in software by, for example, a suitably-configured image processing module such as image processing module in FIG. 1.

Step 300 creates a source image from a web page. An example of how this can be done is provided above. Step 302 processes a pixel row to attempt to identify a pattern. Examples of how this can be done are provided above. Step 304 ascertains whether a pattern has been found in a particular pixel row. Examples of how this can be done are provided above. If a pattern has been found in a particular pixel row, step 306 records the pixel pattern and step 308 ascertains whether there are any more rows in the source image to be processed. If there are more rows to be processed, the method branches to step 302 which processes the next pixel row. If, on the other hand, there are no additional rows to process, step 308 removes an associated border area.

If, on the other hand, step 304 finds no pattern in the pixel row, the method branches to step 308 which ascertains whether there are any more rows in the source image to be processed. If there are additional rows in the source image to be processed, the method branches to step 302 and proceeds as described above. If, on the other hand, there are no additional rows in the source image to be processed and no patterns were found, step 308 terminates the processing.

The above-described method can be utilized to identify either or both of left border areas or right border areas. Once a border area has been identified, it can be removed and the associated source image can be scaled to provide a reduced-size image of the web page.

Having described various embodiments that can provide a reduced-size image of a web page, consider now an example system that can be utilized to implement the embodiments described above.

EXAMPLE SYSTEM

Figure 4:
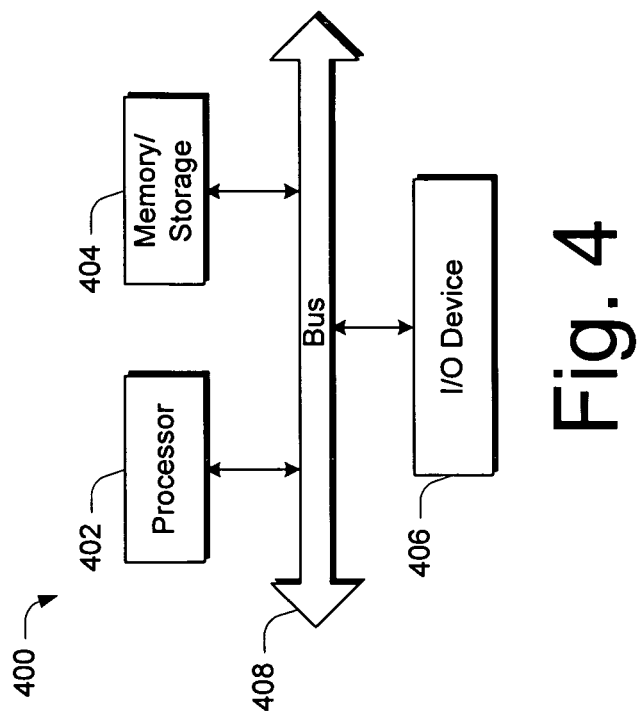
FIG. 4 is a block diagram of an example system that can be utilized to implement one or more embodiments.

FIG. 4 illustrates an example computing device 400 that can implement the various embodiments described above. Computing device 400 can be, for example, various computing devices or servers, such as those illustrated in FIG. 1 or any other suitable computing device.

Computing device 400 includes one or more processors or processing units 402, one or more memory and/or storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Component 404 can include volatile media (such as random access memory (RAM)) and/or non-volatile media (such as read only memory (ROM), Flash memory, optical disks, magnetic disks, and so forth). Component 404 can include fixed media (e.g., RAM, ROM, a fixed hard drive, etc.) as well as removable media (e.g., a Flash memory drive, a removable hard drive, an optical disk, and so forth).

One or more input/output devices 406 allow a user to enter commands and information to computing device 400, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments create a source image from a web page and then process the source image effective to remove left and/or right border areas so that a reduced-size web page image created from the source image has a better chance of capturing relevant content for a viewer.

In at least some embodiments, image processing techniques are utilized to identify repeating patterns of pixels along left and/or right border areas of a source image. The image processing techniques can process individual rows of pixels looking for patterns of pixel color values. Identified patterns of pixel color values are noted and then subsequently used to remove regions of the source image in which repeating patterns occur. Having removed these regions from a source image, the source image can be reduced in a manner directed to improving information density contained in a reduced-size web page image created from the source image.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   creating a source image from a web page;
   processing a pixel row in said source image to attempt to identify a pattern, said processing comprising processing individual pixels in the pixel row on a pixel-by-pixel basis to identify a pattern in the form of matching pixel color values of individual pixels that have been processed on the pixel-by-pixel basis;
   ascertaining whether a pattern in the form of matching pixel color values has been found in the pixel row;
   responsive to finding a pattern in the pixel row, recording the pixel pattern;
   processing additional pixel rows to attempt to identify respective patterns in individual additional pixel rows, said additional processing comprising processing individual pixels in the additional pixel rows on a pixel-by-pixel basis to identify a pattern in the form of matching pixel color values of individual pixels that have been processed in the additional pixel rows;
   recording subsequent pixel patterns associated with said additional pixel rows;
   identifying a border area from the identified pixel patterns; and
   removing the border area associated with identified pixel patterns.

2. The method of claim 1, wherein said removing comprises removing a right border area.

3. The method of claim 1, wherein said removing comprises removing a left border area.

4. The method of claim 1, wherein said removing comprises removing both a left and a right border area.

5. The method of claim 1, wherein said removing comprises removing both a left and a right border area, wherein said removing comprises removing a right border area having a same dimension as the left border area.

6. The method of claim 1 further comprising scaling a source image from which at least one border area has been removed to provide a reduced-size image of the web page.

7. The method of claim 1, wherein said ascertaining comprises using a look-back-buffer to store pixel color values that are utilized to identify the pattern.

8. The method of claim 1, wherein said ascertaining comprises using a look back-buffer to store pixel color values that are utilized to identify the pattern, wherein said look-back-buffer has a maximum defined size.

9. The method of claim 1, wherein the identified border area is a rectangular border area and wherein said removing comprised removing said rectangular border area.

10. The method of claim 1, wherein said processing additional pixel rows comprises, for at least one additional pixel row, starting processing at a pixel other than a first pixel in said at least one additional pixel row.

11. The method of claim 1, wherein said processing a pixel row and said processing additional pixel rows comprise using a threshold above which processing is not performed.

12. The method of claim 1, wherein said processing a pixel row and said processing additional pixel rows comprises using a threshold above which processing is not performed, and wherein said threshold comprises a minimum of a longest pixel run per row.

13. The method of claim 1 further comprising using a skip count to enable a defined number of pixels in a border area to remain after other border areas have been removed.

14. The method of claim 1, wherein said processing a pixel row and said processing additional pixel rows comprises attempting to identify color gradient patterns.

15. A system comprising:
   one or more computer readable hardware storage media; and
   an image processing module embodied on the one or more computer readable hardware storage media and configured to:
   create a source image from a web page;
   process a pixel row to attempt to identify a pattern in terms of pixel color values by processing individual pixels in the pixel row on a pixel-by-pixel basis to identify the pattern;
   ascertain whether a pattern has been found in the pixel row;
   responsive to finding a pattern in the pixel row, record the pixel pattern;
   process additional pixel rows to attempt to identify respective patterns in individual additional pixel rows in terms of pixel color values by processing individual pixels in the additional pixel rows on a pixel-by-pixel basis to identify the respective patterns in the additional pixel rows;
   record subsequent pixel patterns associated with said additional pixel rows;
   identify a border area from the identified pixel patterns;
   remove right and left border areas associated with identified pixel patterns; and
   scale a source image to provide a reduced-size image of the web page.

16. The system of claim 15, wherein said image processing module is configured to remove a right border area having a same dimension as the left border area.

17. The system of claim 15, wherein said image processing module is configured to use a look-back-buffer having a maximum defined size to store pixel color values that are utilized to identify the pattern.

18. The system of claim 15, wherein said image processing module is configured to process additional pixel rows by starting processing at a pixel, on at least one of said additional pixel rows, that is a pixel other than a first pixel in said at least one additional pixel row.

19. The system of claim 15, wherein said image processing module is configured to process pixel rows using a threshold above which processing is not performed.

* * * * *